United States Patent [19]

Lundell et al.

[11] 4,216,254
[45] Aug. 5, 1980

[54] METHOD OF SELECTIVELY TREATING A PLASTIC FILM SURFACE TO PREVENT BLOCKING

[75] Inventors: Edwin O. Lundell, North Plainfield; Walter H. Smarook, Bridgewater, both of N.J.

[73] Assignee: Union Carbide Corporation, New York, N.Y.

[21] Appl. No.: 36,693

[22] Filed: May 5, 1979

[51] Int. Cl.² .................... B29C 27/04; B32B 31/12
[52] U.S. Cl. .................... 428/35; 156/244.17; 156/272; 204/165; 204/168; 264/22; 428/188; 428/516; 428/520
[58] Field of Search ............... 156/244.17, 272; 204/165, 168; 264/22; 428/35, 188, 516, 520

[56] References Cited

U.S. PATENT DOCUMENTS

| 2,859,481 | 11/1958 | Kaghan et al. | 204/168 |
|---|---|---|---|
| 3,017,339 | 1/1962 | Dewey | 204/165 |
| 3,111,471 | 11/1963 | Evans et al. | 204/168 |
| 3,182,103 | 5/1965 | Blaylock, Jr. et al. | 264/22 |
| 3,196,270 | 7/1965 | Rosenthal | 204/165 |
| 3,308,045 | 3/1967 | Sullivan | 204/165 |
| 3,349,154 | 10/1967 | Dighton | 264/89 |
| 3,385,966 | 5/1968 | Rosenthal | 250/325 |
| 3,391,070 | 7/1968 | Morgan | 204/168 |
| 3,407,130 | 10/1968 | Hailstone | 204/165 |
| 3,407,131 | 10/1968 | Hailstone | 204/165 |
| 3,730,753 | 5/1973 | Kerr | 204/168 |
| 3,734,849 | 5/1973 | Schmedding et al. | 156/272 |
| 3,736,494 | 5/1973 | Rosenthal | 250/49.5 GC |
| 3,753,965 | 8/1973 | Looney et al. | 525/369 |
| 3,959,567 | 5/1976 | Bradley | 156/272 |
| 4,028,551 | 6/1977 | Thompson | 204/168 |

FOREIGN PATENT DOCUMENTS 868981 4/1971 Canada .

OTHER PUBLICATIONS

Schonhorn & Hansen, Journal of Applied Polymer Science, vol. 11, pp. 1461–1474 (1967), "Surface Treatment of Polymers for Adhesive Bonding".

*Primary Examiner*—William J. Van Balen
*Attorney, Agent, or Firm*—Adda C. Gogoris

[57] ABSTRACT

Process and product-by-process of selectively treating a surface of plastic film to prevent blocking by blanketing the surface with a noble gas and by striking a corona discharge within the noble gas atmosphere, while the other surface of the film is in contact with some other gas or gas composition, such as air.

41 Claims, 2 Drawing Figures

METHOD OF SELECTIVELY TREATING A PLASTIC FILM SURFACE TO PREVENT BLOCKING

BACKGROUND OF THE INVENTION

1. Field of the Invention

This invention relates to corona discharge treatment of plastic films or preformed hollow articles. More particularly, it relates to corona discharge treatment of selected surfaces of such films or hollow articles in order to prevent them from blocking, especially thermal blocking which results from exposure to a temperature close to the melting point of the plastic.

Blocking can be defined as the tendency of touching film surfaces to adhere to each other or to resist separation. Blocking is caused by either or both of the following: (a) extremely smooth film surfaces, allowing intimate contact and nearly complete exclusion of air, and (b) pressure- or temperature-induced fusion of the surfaces in contact, or both. Blocking develops under a variety of temperatures and pressures. Blocking is a function of time and it may arise from processing, use, or storage. For a method of measuring blocking, see ASTM method D-1893-67.

In practice, film layers are normally separated by a sliding and/or a lifting force. The lifting component is resisted by blocking forces while the sliding component is resisted by frictional forces. Blocking can be measured as the perpendicular component of the force required to peel two film layers apart per unit width of the film specimens. The blocking and frictional forces are theoretically at right angles to each other.

Blocking of film layers in a finished film article such as a bag manifests itself by poor bag opening. The film layers forming the bag may be blocked so severely as to render the bag virtually impossible to open by hand or by equivalent mechanical means and therefore useless in automatic, or rapid manual, filling operations. At times, blocking between two adjacent film layers is so severe that the films appear as one continuous piece. If film is supplied from a blocked pay-off roll, difficulties in film processing through machinery and fabrication may result. If the film layers in the roll were blocked severely, pay-off action could actually come to a halt. A blocked tubular film layflat is difficult to slit and rewind as single sheets, or if the layflat is converted directly into e.g., bags, the block is incorporated into the finished bags. Thus, blocking generally results in excessive waste of film, time, and low yield of finished goods. The above examples are meant to be only a partial listing of difficulties arising from blocking of plastic films, but they serve to illustrate the need for effective methods of blocking prevention.

In this application, the term "biomedical" is used to mean suitable and/or adapted for use in biological, medical and physical science. The terms "inert gas" or "noble gas" are used interchangeably to denote a gas selected from Group VIII of the Periodic Table of Elements.

The term "energize" is used to mean ionize and/or excite. It is used in reference to gas atoms.

The term "corona discharge in an inert atmosphere" or "corona-type discharge" shall be used to designate a process equivalent to that termed "corona discharge" in the art, the only difference being that the medium in wich the discharge of this invention is struck, consists essentially of a noble gas, not air.

The foregoing was a discussion of blocking in plastic films in general and it is not confined to blood bags or the biomedical field.

DESCRIPTION OF THE PRIOR ART

Various methods of preventing blocking of plastic films, and in particular to ethylene polymer films, are known in the art. Use of slip sheets of various compositions between the film layers, separation of the film surfaces by various types of liquids, and separation by use of roughened surfaces either through embossing or through the use of finely divided solid particles such as inorganic fillers, have been employed. For certain applications, however, these methods are either time consuming, or they impart undesirable surface properties to the film. For example, when the films are used in biomedical applications, there may be associated biological problems. In particular, embossing of the surfaces of blood and blood component containers resulting in roughened surfaces, might affect the formed blood elements in contact with the roughened film surface, i.e., it might cause thrombus formation or alternation or destruction of the formed elements of blood. Use of inorganic fillers, such as silica, poses the threat of spallation, which is known to occur in organopolysiloxane tubing.

Additive chemicals such as surface active agents (e.g., the fatty acid salt, zinc stearate) which are mixed into the polymer itself, exude to the surface of the film and are thereby distributed along the surface of the film to form a layer which physically prevents the films from touching, thus preventing blocking. In biomedical applications, the use of such antiblock agents is often unacceptable because the presence on the surface of the film of material potentially extractable from the film by physiological and parenteral solutions in contact therewith may present a toxicological problem, or, such use may be considered unsafe even if such material is classified as non-toxic (e.g. if it cannot be metabolized by and expelled from the body of a living organism).

Typically, an anti-block agent, although present in a proportionally small amount with respect to the bulk of the film, is concentrated at the surface thereof, thus yielding a high effective concentration of potential extractables, and creating a suspect biological environment for physiological and parenteral fluids.

The present invention provides an alternative method of preventing blocking (especially temperature-induced, or "thermal", blocking) of films without making use of slip sheets, surface roughening, or additive chemicals. This method involves subjecting selected film surfaces to a corona-discharge-type treatment conducted not in air but in a noble gas atmosphere. This permits reduction of the blocking tendencies of one film surface without affecting the adhesive properties or coating receptivity of the opposite film surface.

Corona discharge treatment of plastic films in a reactive gas atmosphere, such as air, is widely used to improve the receptivity or anchorage characteristics of such films to inks and adhesives. See for example U.S. Pat. No. 3,017,339 issued on Jan. 16, 1962 to B. Dewey and U.S. Pat. No. 2,391,070 issued on July 2, 1968 to A. W. Morgan. The latter teaches use of a nitrogen (or noble gas) atmosphere to "protect against corona treatment of selected surfaces of film" during corona treatment in air of other surfaces (Morgan, supra col. 1, lines 69–70). By contrast, use of a noble gas atmosphere is necessary in the present invention in order to obtain nonblocking film. The corona is struck specifically within that noble gas atmosphere. Nitrogen has not been found effective as a substitute for a noble gas in the practice of the present invention, at least in the case of treating a nitrogen-filled preformed article by placing it between two electrodes with a sufficient potential difference between them. It is believed that nitrogen molecules react with the surface to produce polar groups which enhance film blocking tendencies. Also they may form moieties with the film surface which can create a biologically suspect environment unsuitable for biomedical uses.

U.S. Pat. No. 3,111,471 issued on Nov. 19, 1963 to T. A. Evans et. al., relates to an electrical discharge treatment of tubular polyethylene film wherein the tubular polyethylene film is collapsed and one surface of the film is selectively treated by glow discharge in order to improve the anchorage characteristics of the film for inks and adhesives.

Contrary to the general teaching of using corona discharge treatment in air to improve anchorage characteristics of plastic materials, U.S. Pat. No. 3,407,130 and No. 3,407,131 issued on Oct. 22, 1968 to T. B. Hailstone disclose processes for treating polyvinylbutyral sheet to reduce blocking. Again, these processes, involve subjecting the film surfaces to corona discharge preferably in a nitrogen atmosphere. These processes can only be practiced on flat or slit open tubular film and they are limited in their applicability to polyvinylbutyral sheeting. Nowhere is it suggested that the procedure disclosed in U.S. Pat. No. 3,407,130 will be effective to reduce blocking of ethylene copolymer film surfaces, especially thermal blocking of such surfaces.

OBJECTS OF THE INVENTION

Accordingly, one or more of the following objects will be achieved by the practice of this invention. It is an object of this invention to provide a method of producing ethylene homopolymer or copolymer films having reduced tendencies to block. Another object is to provide a method of producing ethylene homopolymer or copolymer films with reduced blocking characteristics without making use of anti-block agents, or other additives. A further object is to provide a method for treating ethylene homopolymer or copolymer films with a corona discharge in a noble gas atmosphere to chemically modify a selected side of the film surfaces in order to substantially prevent their blocking. Another object is to treat selected sides of one or more such film surfaces without the necessity of positioning the corona electrode within the noble gas atmosphere and without affecting the adhesive characteristics, the coating receptivity of other film surfaces, or the heat sealability of such other surfaces.

Another object is to selectively treat the inner surfaces of a tubular film with a corona discharge in an argon atmosphere in order to substantially prevent blocking thereof when the film is collapsed, without necessitating slitting open of the tubular film and without affecting the adhesive characteristics and the coating receptivity of the other film surface. Still another object is to provide flexible, irradiated biomedical articles, comprised of ethylene copolymer or homopolymer film, whose inner surfaces do not block during steam sterilization. Another object of this invention is to provide a method of selectively treating the inner surfaces of a flexible, irradiated, formed, hollow, biomedical article comprised of ethylene copolymer film and chemically modifying said surfaces so as to substantially prevent the adherence of the inner surfaces during steam sterilization. An object of this invention is to provide a non-blocking film surface wherein the chemical composition of the bulk of the film is essentially unchanged. A further object of this invention is to provide non-blocking film and non-blocking articles produced by the methods of this invention. These and other objects will readily become apparent to those skilled in the art in light of the present disclosure.

SUMMARY OF THE INVENTION

A method has been found for treating selected surfaces of a plastic film so as to prevent such surfaces from blocking the method comprising:

(a) blanketing the selected film surface with an atmosphere consisting essentially of at least one noble gas;

(b) generating a corona-type discharge within said noble gas atmosphere by applying an electrical potential difference sufficient to energize the atoms of said noble gas atmosphere at least to the point of inducing a visible light emission therein; and (c) maintaining said discharge for a time sufficient to treat the selected film surface so as to substantially prevent blocking thereof, said surface comprising materials selected from the group consisting of those ethylene homopolymers and copolymers which are capable of withstanding said corona-type discharge treatment without suffering substantial polymer degradation in the bulk of the film.

Also, non-blocking film and articles comprising such film have been produced, said film having been rendered non blocking by the above method.

BRIEF DESCRIPTION OF THE DRAWING

The invention will be further explained with reference to the accompanying illustrative drawing in which.

DETAILED DESCRIPTION OF THE INVENTION

Figures 1, 2:
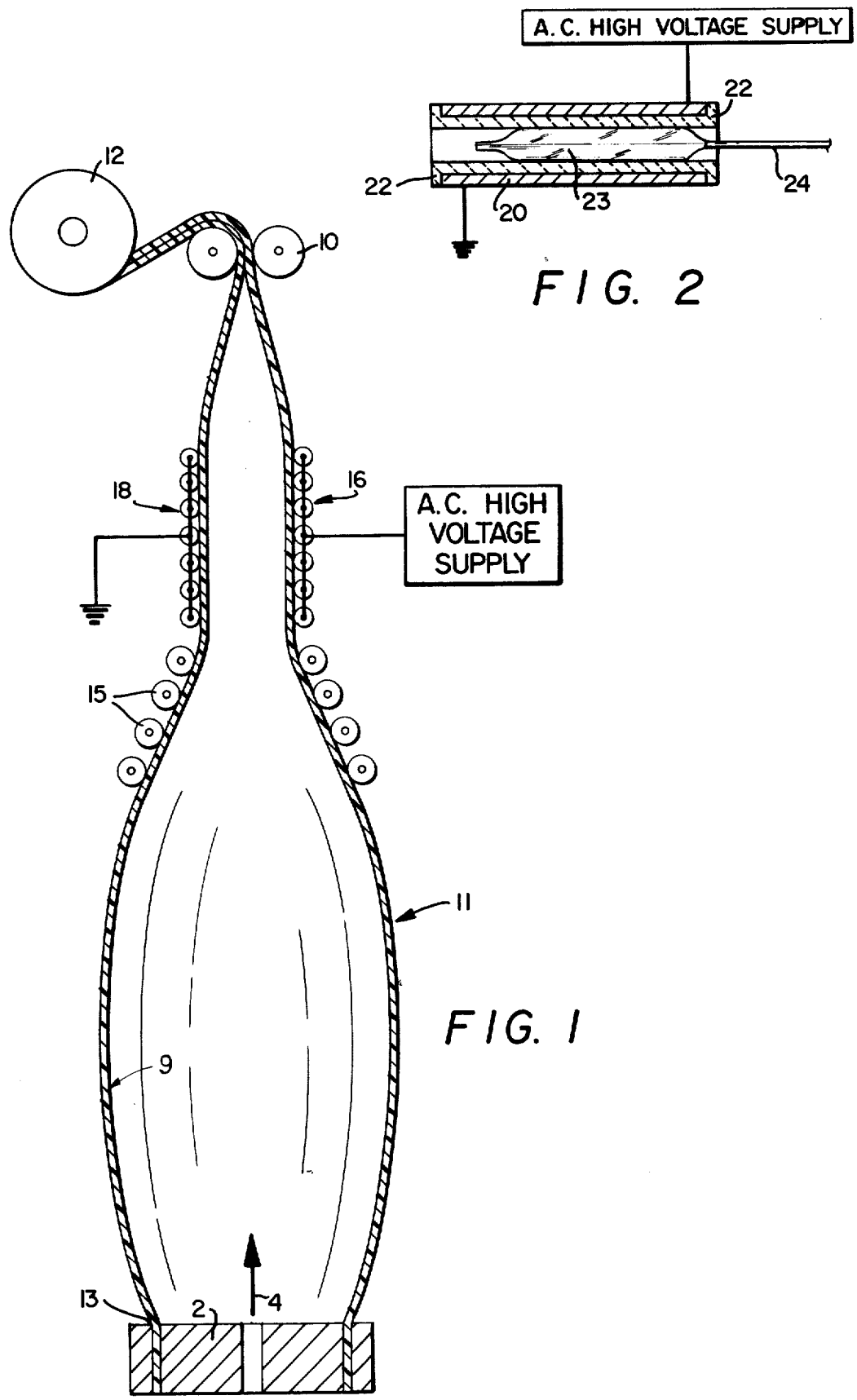
FIG. 1 is a schematic side view with portions broken away showing one embodiment of the method of the present invention as it may be applied to film extruded in tubular form.
FIG. 2 is a schematic side view with portions broken away showing another embodiment of the method of the present invention as it may be applied to a flexible, hollow, plastic package for handling vital fluids.

Blocking-preventive treatment of selected surfaces occurs when the selected surface is subjected to a corona discharge in the presence of a noble gas (and in the abasence of air).

For this treatment to be effective, it is necessary that it be carried out in an atmosphere essentially consisting of a noble gas. In the reduction to practice of the present invention, an atmosphere was used in which the noble gas constituted about 99.99% of the molecules present. However, it has been found that a level of impurities of about 0.05% is allowable. The precise highest tolerable noble gas impurity level has not been determined. It may be a function of the type of impurity present. It is known that the gas has to be more than 99% pure and that an impurity level of about 500 ppm $O_2$, or of about 800 ppm $N_2$, (or less) produces satisfactory results. Non-blocking results would not be achieved if the corona discharge treatment of this invention were carried out in air, nitrogen, oxygen, carbon dioxide, etc. i.e., in gases other than the noble gases. Of the noble gases argon is preferred.

Noble gas blanketing or confinement of a selected surface can be accomplished by any method which serves to deplete the surface of gases other than noble gases to an extent necessary to assure the requisite noble gas purity. In one embodiment of the present invention, involving treatment of a plastic hollow article comprising a plastic film, such as a plastic bag, the undesirable agases were removed by evacuation of the bag by means of a vacuum pump, followed by purging with argon, repetition of the evacuation/purging step and a final filling with argon. In another embodiment involving continuous treatment of tubular film after the step of extrusion and before final collapsing of the film, argon is blown directly into the film bubble from an opening in the die and it is trapped therein by, e.g., the die at one end and pinch rollers at the other end. A continuous flow of argon and a continuous gas pressure keep argon purity inside the tube essentially the same as that of the argon supply.

The noble gas-blanketed surface is subjected to a corona-type discharge by means of an electric field generated between two electrodes. The discharge is struck within this noble-gas atmosphere. The electric field has to be sufficiently intense to energize the inert gas at least to the point of inducing a visible light emission therein (a blue hue in case of an argon atmosphere). Past that point, additional power will serve only to decrease the treatment time required to prevent blocking.

It will be appreciated that in the practice of this method the electrodes do not have to contact nor face the surface of the film that is being treated, nor do they have to be within the noble gas atmosphere themselves. The corona will be struck within the noble gas whether the electrodes are also within the noble gas atmosphere or not because apparently striking a corona discharge in a noble gas requires less energy than striking a corona in air. This affords considerable flexibility in design of an apparatus to carry out the process and it permits convenient treatment of formed film articles or unslit tubular film columns.

From the point of view of treatment efficiency, however, in an embodiment in which the electrodes are not located within the inert gas atmosphere, the part of the space between electrodes which is not occupied by the nobel gas (nor by the film) should be minimized. If e.g. air molecules are present between the electrodes, they will absorb part of the energy of the electric field (which would otherwise be absorbed by the noble gas) and thereby detract from the efficiency of the corona discharge in the noble gas medium.

U.S. Pat. No. 3,736,494 to L. Rosenthal et. al., incorporated herein by reference, discloses a corona discharge apparatus for film treatment which is generally suitable for the methods of this invention. The particular voltage, frequently and current employed will depend on the geometry of the electrodes, the electrode spacing, the article contours and thickness and the composition of the noble gas, and is within the scope of those skilled in the art. 5 kV to 30 kV, 20 to 20,000 Hz and ⅛ to 1" spacing are in the ranges of operation of the corona discharge equipment employed in the practice of this invention. The voltage, spacing and frequency values mentioned here are designed to depict a convenient operating range and they are not intended as limitations of the process. For instance, 20,000 Hz is the maximum frequency obtainable with any presently commercially available equipment.

FIG. 1 shows tubular column of extruded film 11 being extruded from an upright annular extrusion die 2 which is provided with an annular orifice 13. The tubular column is inflated with a stream of noble gas such as argon, the stream generally indicated by arrow 4. The gas is introduced through the central portion of the die to inflate the tube to a size dictated by the film properties desired and limited by feasibility; the tube may be cooled with an externally blown gas such as air. A series of collapsing rolls 15 are provided on opposite sides of the extruded film column 1 to collapse the column.

Common annular die openings generally range from 15 to 60 mils. Diameters of dies are of the other of three to six times the diamter of the extruder screw. Dies may be fed from either the bottom or the side. Tubing is generally extruded upward as shown in FIG. 1, but it may be extruded horizontally or downward. Argon is trapped in the bubble between the die and pinch rollers 10. A continuous flow of argon and a continuous gas pressure maintain the requisite argon purity.

As the melt emerges from the die and starts to cool, the tube is inflated to two or three times the die diameter. The cooled bubble goes into a "V" frame equipped with small rollers 15 or slates which partially collapse the cylindrical tube in order to facilitate its passage between high voltage rollers designated by the number 16 and the grounded rollers 18, with which the film is in contact.

Rollers 16 and 18 are coated with dielectric material such as polytetrafluoroethylene coating. They are in parallel alignment facing one another and are spaced apart a predetermined distance sufficient to maintain a stable corona discharge therebetween for a given high voltage value. The high voltage rollers 16 are connected in parallel to an A/C high voltage supply, typically 3 kHz and 20 kV, for a ⅜" electrode spacing. For a given electrode spacing, the high voltage should be at least sufficient to strike and subsequently maintain a corona discharge in argon (evidenced by a blue glow). The film should be treated for a time period long enough to effectively reduce its blocking. The time of treatment necessary is a function of the electrical energy flux between the electrodes, of film composition, and contemplated end use, as explained below.

Placing the electrodes in contact with the film is one method of displacing air gaps from the electric field and the path of the discharge.

The film column is corona treated on its inner surfaces 9, by means of an electric field generated between the electrodes 16 and 18. The corona is visible and it has a light blue color. The tube may then be closed flat by nip rolls 10 which draw the film away from the die before it is further processed, for example, by winding the film on to take-up roll 12, or by slitting it and opening it, or by other processing steps.

In order to completely define the system, the power and the length of the treatment, or the electrical energy necessary to obtain non-blocking results should be specified. The electric field should be of course at least sufficient to strike the corona: about 10,000 volts per inch. The amount of electrical energy necessary depends on the degree to which blocking is sought to be reduced, i.e. on the highest tolerable force necessary to separate two films, and is therefore a function of the film material and of its end use. The following is a description of the energy requirement as a function of peel strength.

Peel strength, the force per unit length of film required to pull two film layers apart, can be used to measure blocking. The lower the peel strength of the film, the less its tendency to block. The highest peel strength that can be tolerated in a film depends of course on its end use. For biomedical applications, for example involving biological containers such as blood bags a peel strength up to 8 gm/cm and even 10 gm/cm can be tolerated, because these bags may only need to open under the line pressure of the infused biological liquid. To achieve a post-treatment peel strength of less than 8 gm/cm the film should be exposed to a corona whose energy density corresponds to about 600 (watt) (min)/(ft)$^2$ at most. This value range is appropriate for an ethylene homopolymer or copolymer film having a thickness between about 0.5 and 75 mils. For the same type of film, the following values of the operating parameters depict a practical and convenient operating range: an alternating current frequency between about 20 and 20,000 Hz,* a voltage between about 10 kV and 30 kV, and an electrode spacing between about ⅛ and 1 inch. It should be emphasized that the above parameter ranges largely represent ranges of practical convenience and they do not constitute limitations of the process. The only real limitations are (a) one of voltage: the voltage has to be sufficient to strike a corona in a noble gas (argon);
(b) one of power: there has to be sufficient power to provide the energy density necessary for the electric field, and
(c) one of time: the time of treatment has power to provide the energy density necessary for the electric field, and
(c) one of time: the time of treatment has to be sufficient to produce non-blocking results.

Of course once the voltage threshold of striking the corona has been exceeded, the higher the power, the less the time required to produce a film (or article) of a certain given non-blocking characteristic. In each case, in determining optimum operating conditions, the efficiency of the process should be taken into account. The above parameter values will generally give satisfactory results for film transport speeds sufficient to provide a film residence time in the corona unit between 15 and 60, and particularly between 15 and 35, seconds, but these parameter values are otherwise independent of the particular embodiment of the process.

* It is also possible to use radiofrequency or DC current, but intermediate frequencies are preferred. For use of DC current in corona-type discharge, see e.g. U.S. Pat. No. 3,196,370 issued to L. Rosenthal on July 20, 1965.

In some applications, such as steam sterilization of a biomedical article, it is necessary to subject the film to temperatures near or above its melting point for a time sufficient for adhesion of the inner film walls to occur. Thus, while the inner walls of e.g. a blood package are easily separable prior to steam sterilization, after steam sterilization they exhibit severe thermal blocking. Crosslinking of plastic films by means of ionizing radiation is often desirable as a means of enhancing the mechanical properties and raising the melting point of the film. However, as such crosslinking is conducted in air, it appears to increase the blocking effect. It is theorized that the same properties which permit heat sealing of these films are primarily responsible for their adhesion during sterilization. This proposition is supported by the following observations:

(a) opposite film surface which were not exposed to the inert gas during the discharge, or portions of untreated film were readily receptive to heat sealing;
(b) in addition, film surface portions prevented from exposure to the noble gas during treatment (e.g. by pinching or masking) remained heat sealable thereafter;
(c) that abrasion of the surface of treated film would restore heat sealability, but also cause blocking.

Abrasion of the surface does not have to extend in depth before heat sealability is restored. This indicates that the chemical modification of the surface believed to be responsible for the non-blocking effect is confined to the surface and it does not extend to the bulk film.

It is believed that with the method of this invention, the inner surfaces of such a package can be selectively crosslinked to such a degree as to completely prevent the adherence of these surfaces during steam sterilization. See for example H. Schonhorn and R. H. Hansen: "Surface Treatment of Polymers for Adhesive Characteristics" J. App. Pol. Sci., v. 11, pp. 141–174, 1967.

By selectively subjecting the inner film surfaces of a package fabricated from radiation crosslinked ethylene-/alkyl acrylate or ethylene/vinyl ester copolymer to corona discharge in an argon atmosphere at moderate power levels and short times, it has been possible to selectively crosslink the surfaces so as to reduce their interfacial peel strength to below 8 gm/cm. Such surfaces will not block. Such a package has been disclosed in our patent application entitled "Flexible, Sterilizable Irradiated Plastic Article for Handling Vital Fluids" which was filed on the same day as the present application.

The argon corona discharge generated within the confined region of treatment is believed to create radical species on the treated film surfaces. Since these radicals are isolated from gaseous deactivating materials, they eventually react with one another to form a highly crosslinked network on the treated surface of the film. This highly crosslinked surface then prevents the film from blocking, without significantly altering the chemical composition of the bulk film, as the treatment affects only a very thin layer of the film surface. Of course, the foregoing hypothesis as to the manner in which the corona treatment of this invention acts to prevent blocking is not dependent on the form of the article or film nor on its specific composition, nor on its end use.

Of course films or articles which neither need to be steam sterilized, nor are otherwise exposed to temperatures close to their melting point, do not require as long or as powerful a treatment in order not to block. After treatment, the argon may be purged with another gas before further use of the article and/or film.

It has been found that the presence during steam-sterilization of a small amount (film) of water between the corona treated film surfaces or within the hollow article, improves the effect of the corona treatment in that it allows for non-blocking results in articles which have received corona treatment for less time and/or of less power than that required to produce the same results in the absence of water. Also, water containing a small quantity of citrate buffer having a pH of 5.8 (e.g., citrate-phosphate-dextrose or other citrate anticoagulent solution) further decreases the duration and/or power of the corona treatment necessary to produce non-blocking results.

FIG. 2 illustrates an embodiment of the present invention involving corona treatment of a plastic hollow article. Electrodes 20, separated a predetermined distance by suitable means such as non-conductive spacers or holders, are coated with dielectric insulator 22. Suitable dielectric material includes ceramics, glass, plastic and combinations thereof. The article 23, here a blood bag, is placed between the dielectric coated electrodes. The article is evacuated by means of tube 24 and a vacuum pump (not shown) and purged with argon which enters the article from an argon supply (not shown) also through tube 24. In experiments involving blood bags, this evacuation/argon-purge cycle was preferably repeated twice in order to ensure non-blocking bags. The number of argon purges necessary is well within the scope of the art.

After the last argon purge, the article is filled with argon. At this point there should be substantially no air gaps in the path of the discharge, i.e. between the outer article contours and the dielectric material 22, and the article should present a substantially planar surface to the electrodes. This insures uniform, efficient treatment of the inner sides. Therefore, the dielectric-coated electrodes must be spaced apart a distance barely sufficient to allow the argon-filled article to be positioned therebetween so as to ensure a subsequent corona treatment of high power, efficiency, and intensity. It is well-known that the intensity of the discharge is proportional to the potential difference and inversely proportional to the electrode spacing.

The invention can be further illustrated by the following examples:

EXAMPLE 1

A tubular film of EEA (ethylene-ethyl acrylate, 18% EA by weight) copolymer was formed using a conventional small biaxial orientation film line. Instead of air, 99.996% pure argon was used to blow and maintain the film bubble. The bubble was then partially collapsed by ladder rolls before it was passed through a set of parallel plate electrodes (described below). When an electric potential was applied across the electrodes, an argon electrical discharge was generated inside the tubular film, thereby treating the inner surface of the film. The film was then collapsed with a pair of nip rolls and collected for testing.

Electrode Description

The parallel plate electrode system consisted of two 9"×12" wire screens mounted individually on two flat plates made of a non-conductive material.* Each plate was then wrapped with a sheet of tetrafluoroethylene as a dielectric, and to reduce friction between the electrodes and the blown film. These electrodes were held in place by a wooden structure and kept apart with non-conductive spacers. The electrode gap ($\frac{1}{4}$"-$\frac{3}{4}$") was controlled by the thickness of the spacers used. A variable frequency (20–3000 Hz) high voltage (~30 kv) source supplied the necessary electric field.

*On the use of wire screen electrodes see generally U.S. Pat. No. 3,385,966 entitled "Corona Discharge Electrodes of Opposing Polarity Rotatable about a Common Axis to Treat Polymer Surfaces" and issued to L. A. Rosenthal on May 28, 1968.

In this example, with the electrodes $\frac{1}{2}$" apart, a satisfactory argon electrical discharge was generated and maintained at 11 kv oscillating at a frequency of 3 kHz. The tubular film was adjusted to pass through the electrodes at a rate of 7 ft./min. Blocking characteristics of the inside surfaces of treated and untreated film are summarized below:

| Sample | High Voltage (kv) | Power (w) | Film Rate (ft./min.) | Blocking |
|---|---|---|---|---|
| 10565-158-1 | 0 | 0 | 7 | yes |
| 10565-158-2 | 16.0 | 80 | 7 | none |
| 10565-158-3 | 16.4 | 82 | 7 | none |

EXAMPLE 2

Flat containers of about 500 ml expanded volume containing two ports were fabricated from irradiated (by Van de Graaff electron accelerator to a dose of, 20 Mrad)ethylene/ethyl acrylate (18% EA). These containers were then placed between the electrodes (~$\frac{3}{8}$" gap of a corona discharge apparatus and flushed for 5 min. with argon at a flow rate sufficiently great to inflate the containers to about $\frac{1}{4}$" separation. A discharge was then created at 15,400 volts and 190 watts for various durations, followed by a 5 min. argon flushing after the discharge had ceased.

At the end of the last argon flush, 3 ml of water were introduced into the bag, the ports were heat sealed and the bags were autoclaved in a steam autoclave. Following the steam sterilization, the containers were assessed for blocking (adhesion) of the inside surfaces.

| Sample | Voltage (kV) | Power (watts) | Time (sec) | Blocking (visible) |
|---|---|---|---|---|
| 1 | 15.4 | 192 | 30 | none |
| 2 | 15.4 | 192 | 60 | none |
| 3 | 15.4 | 192 | 85 | none |
| 4 | 15.4 | 192 | 60 | none |
| 5 | 15.4 | 192 | 30 | none |
| 6 | 15.4 | 192 | 15 | none |
| 7 | 15.4 | 192 | 5 | none |

After sterilization without the corona treatment, blocking was so severe that the bags were rendered totally useless.

EXAMPLE 3A

Effectiveness of Corona Treatment on Simulated Blood Bags with Varying Levels of Argon Purity.

Two groups of blood collection bags made from ethylene ethyl acrylate resin (containing 15% by weight ethyl acrylate) 12 mil thick film, were irradiated to a total dose of 11.8 Mrad and 18 Mrad, respectively. Each bag was then placed in the $\frac{3}{8}$ in./gap between two thermal shock-resistant glass plates (12 in.×12 in.×$\frac{1}{8}$ in.) held apart by $\frac{3}{8}$ in. Lucite* spacers at the corners. Metal electrodes (plate and screen) were placed outside each glass plate. The bag port opening was connected to an automated vacuum/gas purge unit.

*Trademark of E. I. DuPont de Nemours & Co., Inc.

The bag was purged of air by a 10 sec. evacuation followed by a 0.3 sec. fill with one of the argon mixtures listed in the Table below. This purge/fill procedure was repeated. The bag was then filled with the same argon mixture by applying to the electrodes an oscillating electrical charge of about 2500–3000 Hz and 25,000–30,000 volts for 30 sec. Then the bag was allowed to equilibrate with air. It was then filled with about 3 ml of CPD anticoagulant solution (prepared according to U.S. Pharmacopoeia X1X, pp 34–35), capped and steam sterilized using a cycle of 5 min. steam purge to remove air, 27 min, of controlled 100% steam at 121° C., 2 minutes rapid cool-down.

The bag was tested for blocking by connecting a port entry to a 100 mm Hg hydrostatic pressure water reservoir, the water containing red vegetable dye (to simulate blood). The ease with which the water parted the inside surfaces of the filled bag was observed. If there were any areas of non-separation, the bag was judged unacceptable. 100 mm Hg is comparable to human circulatory blood pressure.

TABLE

| Argon Mixture | Degree of Blocking Observed |
| --- | --- |
| Commercial High Purity Argon (99.996%) | none |
| Ar + 28 ppm $O_2$ | none |
| Ar + 55 ppm $O_2$ | none |
| Ar + 103 ppm $O_2$ | none |
| Ar + 480 ppm $O_2$ | none |
| Ar + 52 ppm $N_2$ | none |
| Ar + 125 ppm $N_2$ | none |
| Ar + 450 ppm $N_2$ | none |
| Ar + 760 ppm $N_2$ | none |

It was concluded that the impurities content was below the critical level. No blocking was observed even in bags which had received the lower radiation dose.

EXAMPLE 3B

Same as Example 3A except the bag were autoclaved dry (without water or anticoagulant solution). It had been previously experimentally determined that effective blocking prevention in dry bags required a 60 sec. corona treatment instead of a 30 sec. treatment as in Example 3A. The argon mixtures used and the results observed were identical to those of Example 3A.

EXAMPLE 4

Bags were prepared, irradiated to a dose of 12.5 Mrad and corona treated using different purge/fill cycles and different fill gas compositions. Then bags were steam sterilized both dry and with water/anticoagulant solution (3 ml citrate-phosphate-dextrose) in a cycle similar to that of Example 3B.

Plate electrode gaps from ¼" to ½" have been used with the standard corona treatment with essentially equivalent results. Sufficiently high voltages and treatment times are important. Treatment at 28,800 volts for 10 seconds and treatment at 20,000 volts for 50 seconds have produced equivalent results but in both cases the results have been inferior to those obtained by treatment at e.g. 28,800 volts for 60 seconds. The type of purge cycle and argon purity are very important.

The data and the blocking test results are listed below:

TABLE

ELECTRODE GAP ⅛"
BAGS AUTOCLAVED UNFILLED OR WITH 10CC CPD SOLUTION

| | PURGE CYCLE | VOLTAGE | TIME | BLOCKING |
| --- | --- | --- | --- | --- |
| 1. | 2 Nitrogen Purges/Nitrogen Fill | 28,800 | No Observed Corona | Severe |
| 2. | 1 Nitrogen Purge/Argon Fill* | 28,800 | 60 sec | Severe |
| 3. | 2 Nitrogen Purges Argon Fill* | 28,800 | 60 sec | Severe |
| 4. | 2 Argon Purges/Argon Fill with minute leak in bag* | 28,800 | 60 sec | Severe |
| 5 | 2 Argon Purges/Argon Fill (5 minute delay)* | 28,000 | 60 sec | Severe |
| 6. | No Purge/Argon Fill* | 28,800 | 60 sec | Moderate |
| 7. | 1 Argon Purge/Argon Fill | 28,800 | 60 sec | Low |
| 8. | 2 Argon Purges/Argon Fill | 28,800 | 60 sec | None |

In run number 4 a pinhole leak was introduced in order to study the effect of imperfect sealing. In run number 5, five minutes were allowed to elapse between the last argon fill and the striking of the corona to determine whether in that time enough air would diffuse through the film to contaminate the argon and affect the result.

The star (*) in the above table means the corona color was purple rather than blue. It was observed that the appearance of a purple corona always coincided with the presence of unacceptable blocking on the bag after steam sterilization.

It is concluded that (a) nitrogen cannot replace argon as a purge and/or fill gas; (b) contamination of the argon with air either as a result of small leak or as a result of diffusion cannot be tolerated; (c) a system using only argon gives very satisfactory results.

What is claimed is:

1. A method of treating a selected plastic film surface to substantially prevent said surface from blocking, the method comprising:
   (a) blanketing the selected film surface with an atmosphere consisting essentially of at least one noble gas;
   (b) generating a corona-type discharge within said noble gas atmosphere by applying an electrical potential difference sufficient to energize the atoms of noble gas atmosphere at least to the point of inducing a visible light emission therein, and
   (c) maintaining said discharge for a time sufficient to treat the selected film surface so as to substantially prevent it from blocking, said surface comprising materials selected from the group consisting of those ethylene homopolymers and copolymers which are capable of withstanding said corona-type discharge treatment without suffering substantial polymer degradation in the bulk of the film.

2. A method according to claim 1 wherein step (b) is accomplished by positioning said noble gas-blanketed surface between two electrodes spaced apart a predetermined distance and by applying said potential difference between said electrodes.

3. A method according to claim 2 wherein film surfaces other than said selected surface are exposed to an atmosphere other than a noble gas atmosphere.

4. A method according to claim 3 wherein said noble gas is argon.

5. A method according to claim 4 wherein said other atmosphere is air.

6. A method according to claim 5 wherein said discharge is struck between said electrodes while at least one of said electrodes is located without said noble gas atmosphere.

7. A method according to claim 6 wherein said selected surface constitutes at least part of the inner surface of a hollow tubular film column.

8. A method according to claim 7 wherein said treatment is integral with and constitutes part of a process of film extrusion.

9. A method according to any of claims 3 through 8 wherein said other atmosphere occupies at most an insubstantial part of the path of said discharge.

10. A method according to claim 8 wherein two substantially parallel and substantially flat portions of said film are placed between said electrodes, said column being partially collapsed.

11. A method according to claim 10 wherein said film portions are in substantial contact with said electrodes, said argon occupying the space between said film portions within said partially collapsed column, so as to substantially eliminate air gaps in the path of the discharge.

12. A method according to claim 11 wherein said selected surface is in a corona whose energy density corresponds to about 600 watt-minutes of energy per ft.$^2$ of film surface at most, said film ranging in thickness from about 0.5 to 75 mils.

13. A method according to claim 11 or 12 wherein the operating parameters range from about 5 kV to 30 kV for the electrical potential, from about 20 Hz to 20 kHz for the current frequency, and from about $\frac{1}{8}$ to 1 inch for the electrode spacing, said method being practiced at essentially atmospheric pressure.

14. A method according to claim 13 wherein said surface is treated under such conditions of power as to achieve substantially non-blocking results in a time of treatment ranging from about 15 to about 35 seconds.

15. A method according to claim 14 wherein said plastic film has been crosslinked by means of ionizing radiation.

16. A method according to claim 5 wherein said selected surface is the inner surface of a flexible article having a cavity and comprising a plastic film.

17. A method according to claim 16 wherein step (a) comprises rendering the interior of said article essentially free of gases other than noble gases and filling the interior of said article with at least one noble gas.

18. A method according to claim 17 wherein step (b) further comprises positioning said article between said electrodes by placing the contours of said article in substantial contact with said electrodes, thereby substantially removing air gaps from the path of the discharge.

19. A method according to claim 18 wherein the step of rendering the interior surfaces of said article essentially free of gases other than noble gases is accomplished by evacuating said interior and by purging it with a noble gas until the gas contained in said article is of essentially the same composition as the purge gas.

20. A method according to claim 19 wherein said purge gas is argon.

21. A method according to claim 20 wherein the operating conditions range from about 5 kV to about 30 kV for the electrical potential, from about 20 Hz to 20 kHz for the current frequency and from about $\frac{1}{8}$ inch to about 1 inch for the electrode spacing, said method being practiced at essentially atmospheric pressure.

22. A method according to claim 21 wherein said film has been in a corona whose energy density corresponds to 600 (watt)(min)/(ft)$^2$ of film surface, at most.

23. A method according to claim 22 wherein said plastic film has been crosslinked by means of ionizing radiation.

24. A method according to claim 23 wherein said film comprises a copolymer of ethylene and a comonomer selected from the group consisting of alkyl esters of $\alpha,\beta$ ethylenically unsaturated carboxylic acids said esters having from about 3 to about 8 carbon atoms in the acid moiety and from about 1 to about 8 carbon atoms in the alkyl moiety.

25. A method according to claim 24 wherein said ester comonomer content ranges from about 1 to about 15 mole percent.

26. A method according to claim 25 wherein said ester comonomer is ethyl acrylate.

27. A method according to claim 26 wherein said article has a post-treatment peel strength below 9 gm/cm.

28. A method according to claim 23 wherein said film comprises a copolymer of ethylene and a comonomer selected from the group consisting of vinyl esters of saturated carboxylic acids said acids having from about 2 to about 8 carbon atoms in the acid moiety.

29. A method according to claim 28 wherein said vinyl ester comonomer content ranges from about 1 to 15 mole percent.

30. A method according to claim 29 wherein said comonomer is vinyl acetate.

31. A method according to claim 30 wherein said article has a post-treatment peel strength below 9 gr/cm.

32. A method according to claim 23 wherein said method comprises:
 (a) treating said film with said corona-type discharge imparting to said film one half the energy required to substantially prevent said film from blocking;
 (b) introducing a citrate buffer solution between film layers thereby substantially preventing blocking upon exposure of said film to temperatures about its melting point.

33. A method according to claim 32 wherein said citrate buffer solution is a citrate-phosphate-dextrose anticoagulant solution in water.

34. A flexible article having a cavity and comprising a plastic film, said film having a selected surface modified by exposure of said surface to a corona-type discharge treatment conducted in an atmosphere consisting essentially of a noble gas, under conditions of power and time sufficient to substantially prevent film blocking, wherein said film comprises a polymer selected from the group consisting of those ethylene homopolymers and copolymers which are capable of withstanding said discharge treatment without suffering substantial polymer degradation in the bulk of the film.

35. An article according to claim 34 wherein said selected surface forms part of the interior surface of said article and wherein the opposite surface of said film is exposed to an atmosphere consisting essentially of air.

36. An article according to claim 35 wherein exposure of said selected surface to said atmosphere consisting essentially of a noble gas is accomplished by rendering the interior of said article essentially free of gases other than noble gases by evacuating said interior and by purging it with a noble gas until the gas composition in said interior of said article is essentially identical to that of the purge gas, and by filling said interior with said noble gas.

37. An article according to claim 36 wherein said treatment is accomplished by:
   (a) placing said article between two electrodes;
   (b) applying between said electrodes an electrical potential difference sufficient to energize the atoms of said noble gas at least to the point of inducing a visible light emission therein; and
   (c) maintaining said discharge for a time sufficient to treat the interior film surface so as to substantially prevent said surface from blocking.

38. A flexible film having a selected surface modified by exposure of said surface to a corona-type discharge treatment conducted in an atmosphere consisting essentially of a noble gas, under conditions of power and time sufficient to substantially prevent film blocking, wherein said film comprises a polymer selected from the group of those ethylene homopolymers and copolymers which are capable of withstanding said discharge treatment without suffering substantial polymer degradation in the bulk of the film.

39. A film according to claim 38 wherein said selected surface forms part of the interior surface of a hollow tubular film column in the process of being extruded.

40. A film according to claim 39 wherein exposure of said selected surface to said noble gas atmosphere is accomplished by employing a stream of said noble gas to inflate said film column and to maintain said column inflated.

41. A film according to claim 40 wherein said treatment is accomplished by:
   (a) passing said column between two electrodes spaced apart a specified distance;
   (b) creating between said electrodes an electrical potential difference sufficient to energize the atoms of said noble gas at least to the point of inducing a visible light emission therein and maintaining said discharge, and
   (c) adjusting the extrusion speed of said column so as to provide for said film surface a residence time between said electrodes sufficient to treat said surface so as to substantially prevent it from blocking.

* * * * *